Oct. 8, 1929.   J. A. POOLE   1,730,945
FLEXIBLE CORD CONNECTION FOR ELECTRICAL APPLIANCES
Filed June 6, 1925
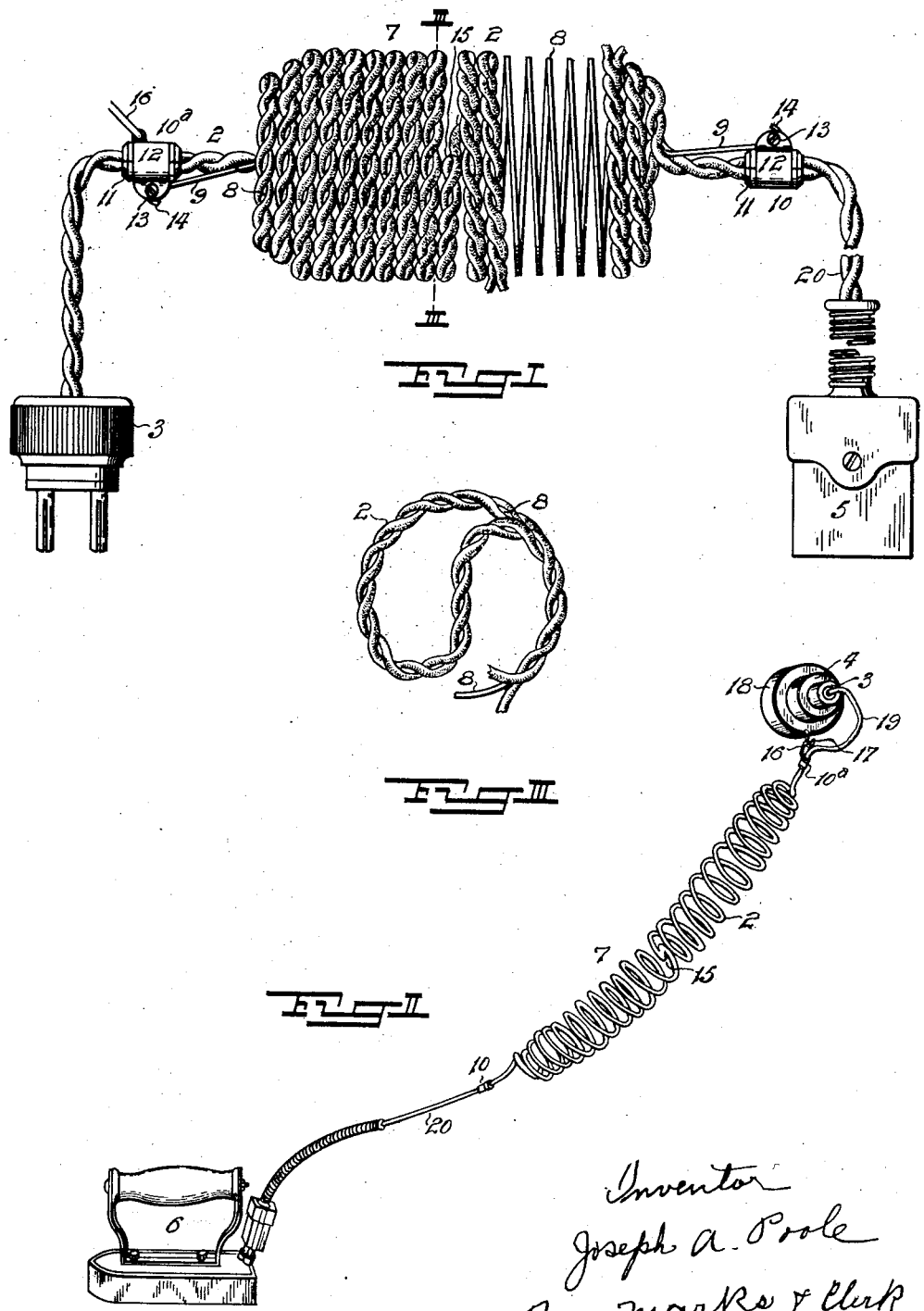

Patented Oct. 8, 1929

1,730,945

UNITED STATES PATENT OFFICE

JOSEPH ALEXANDER POOLE, OF DURBAN, SOUTH AFRICA

FLEXIBLE CORD CONNECTION FOR ELECTRICAL APPLIANCES

Application filed June 6, 1925, Serial No. 35,385, and in the Union of South Africa April 20, 1925.

The present invention has reference to the flexible cord connection employed for coupling electric flat irons and other electrical appliances to the outlet of the permanent wiring.

An object of the invention is to avoid any considerable length of loose flex which tends to get under the iron and is otherwise inconvenient, whilst permitting the usual freedom of movement of the iron or appliance relatively to the outlet.

Another object is to enable the plug of a plug and socket connection to be kept conveniently near the socket when withdrawn therefrom. A further object is to lessen deterioration of the flex resulting from localized bending.

The invention is illustrated in the accompanying drawing in which Fig. I shows a flexible connection constructed according to the invention, and Fig. II shows the same in use for connecting an iron to a wall socket. Fig. III is a sectional plan on III—III Fig. I.

2 indicates a piece of flex of the usual type consisting of insulated twin strands twisted together. At one end the flex is provided with the plug 3 which is inserted into the socket outlet 4 fixed for instance to a wall. At its other end is the socket connection 5 to the iron 6 or other appliance.

According to the invention a portion 7 of the flex is formed as a coil spring, such as to maintain the whole connection under slight tension and capable of considerable extension with moderate force.

For this purpose in the example shown the flex is combined with a helical spring 8 of light steel wire of such thickness of wire, diameter of coil and number of turns as to provide, by its extension, for the necessary change of position of the iron relatively to the socket which is usually provided for by a loose length of flex. For a household iron a spring of steel wire of 18½ S. W. G. with 25 coils of 2" diameter has been found satisfactory.

The flex is incorporated with the spring in any suitable manner, preferably by simply wrapping the flex about the wire, when the latter takes up the position shown between the strands of the flex and forms a core therein.

The ends 9 of the spring are preferably bent outwards into the axis of the coil and secured to the flex by clips 10, 10$^a$. Said clips may each consist of a split insulating spool 11 secured or clamped about the flex by a metal clamp 12, the screw 13 of which passes through an eye 14 in the end of the spring wire.

It is preferred to wind one half of the spring 8 to one hand and the other half to the other hand. The change of direction of the wire is indicated in Fig. III and also appears at 15 in Figs. I and II. The purpose of thus changing the direction of winding of the spring is to obviate relative rotation of the ends 9 of the spring when the spring is extended and retracted and thus avoid twisting of the flex.

The clamp 10$^a$ nearest the socket plug is provided with a hinged bail 16 or the like by which it is hung on a hook 17 screwed to the base 18 of the socket 4. A length of flex is left between the upper clip 10$^a$ and the socket plug 3, of such length as to form a loose loop 19 when the bail 16 is on the hook 17.

A convenient length of unmodified flex 20 is left between the lower clip 10 and the iron socket 6.

In use the connection follows the movement of the iron by extension and retraction of the spring 8 and by the swinging of the bail 16 on the hook 17. The spring maintains throughout the flexible connection a slight tension which tends to gather in the connection toward the socket 5 and to keep any part of it from getting in the way of the iron. The bail connection permits the necessary angular movement of the connection relatively to the socket 4 without bending of the flex at the clip 10$^a$, with only slight and well distributed bending in the loose loop 19 of flex, and without tension in said loop. The flex immediately in the vicinity of the plug 3 is accordingly protected against the damage it usually suffers owing to its being tensioned and being repeatedly bent sharply at the point of its entry into the plug.

When the plug 3 is removed from the socket it is supported by the hook 17 and thus remains within easy reach for replacement into the socket.

I claim:—

1. The method of forming an electrical flexible cord connection, with utilization of ready-formed twin wire flex consisting of two insulated flexible wires twisted together in helical form, the said method comprising the step of wrapping such flex about a spring wire and thereby causing the spring wire to enter the helices of the flex and form a core in the flex.

2. The method as claimed in claim 1 comprising the further step of first forming the spring wire into a coil spring.

3. An electric flexible cord connection comprising a slack-take-up coil spring, conducting flexible wires led along and secured to the coils of said spring and extending beyond the ends thereof, an electric coupling at one end of the flexible wires adapted to connect the same to a current using device, a coupling at the other end of the flexible wires suitable for connecting the same to an electrical outlet, and means on the flexible cord connection for loosely hanging the same from a support, said means and the outlet coupling being spaced from one another along the flexible wires sufficiently to leave between them a loose untensioned loop of flex when the said means is hung at a point on or adjacent to an outlet to which the outlet coupling is connected.

4. An electric flexible cord connection comprising a slack-take-up coil spring having outwardly turned ends, conducting flexible wires led along and secured to the coils of said spring and having ends extending beyond the out-turned ends of the spring, and clips fastening said flexible wire ends to and in line with the out-turned ends of the spring.

5. In an electric flexible cord connection as claimed in claim 4, means on one of the clips for hanging it to a fixed support, said means being such as to permit the connection free angular movement relatively to such support.

In testimony whereof I have hereunto set my hand.

JOSEPH ALEXANDER POOLE.